United States Patent
Yasui

(10) Patent No.: US 7,344,142 B2
(45) Date of Patent: Mar. 18, 2008

(54) STABILIZER CONTROL APPARATUS

(75) Inventor: Yoshiyuki Yasui, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 10/587,715

(22) PCT Filed: Feb. 10, 2005

(86) PCT No.: PCT/JP2005/002070

§ 371 (c)(1),
(2), (4) Date: Jul. 28, 2006

(87) PCT Pub. No.: WO2005/077684

PCT Pub. Date: Aug. 25, 2005

(65) Prior Publication Data
US 2007/0114733 A1    May 24, 2007

(30) Foreign Application Priority Data
Feb. 12, 2004    (JP) .............................. 2004-034500

(51) Int. Cl.
*B60G 17/015* (2006.01)
(52) U.S. Cl. .............................. 280/5.511; 280/124.13; 280/124.15
(58) Field of Classification Search ............ 280/5.511, 280/124.134, 124.137, 124.149, 124.152
See application file for complete search history.

(56) References Cited

U.S. PATENT DOCUMENTS

| 4,648,620 A | * | 3/1987 | Nuss | 280/5.511 |
| 6,149,166 A | * | 11/2000 | Struss et al. | 280/5.511 |
| 6,175,792 B1 | | 1/2001 | Jones et al. | |
| 6,354,607 B1 | | 3/2002 | Kawashima et al. | |
| 6,425,585 B1 | | 7/2002 | Schuelke et al. | |
| 6,550,788 B2 | | 4/2003 | Schmidt et al. | |

(Continued)

FOREIGN PATENT DOCUMENTS

EP    1 362 721 A2    11/2003

(Continued)

OTHER PUBLICATIONS

"Dynamic Drive", BMW Group: Innovation: Technology: [online], Jul. 30, 2002, 4 pages.

(Continued)

*Primary Examiner*—Toan To
(74) *Attorney, Agent, or Firm*—Buchanan Ingersoll & Rooney PC

(57) ABSTRACT

To provide a small-sized stabilizer control apparatus for actively restraining a roll of a vehicle body within an output range of an electric motor, and certainly providing a torsion spring characteristic inherently owned by a stabilizer bar, if the output exceeds the range. A stabilizer actuator having an electric motor and a speed reducing mechanism is disposed between a pair of stabilizer bars disposed between a right wheel and a left wheel. The inverse of the product of a normal efficiency and a reverse efficiency of the speed reducing mechanism $\{1/(\eta P \cdot \eta N)\}$ is equal to or greater than 1.17 and equal to or smaller than 3.75, and the output of the electric motor is controlled to be held or reduced, when the turning state has come to be out of such a range that the rolling motion of the vehicle body can be actively controlled.

4 Claims, 10 Drawing Sheets

U.S. PATENT DOCUMENTS

| | | | |
|---|---|---|---|
| 6,698,767 B2* | 3/2004 | Hagan | 280/5.511 |
| 6,811,166 B2* | 11/2004 | Carlstedt et al. | 280/124.152 |
| 6,856,871 B2* | 2/2005 | Mould et al. | 701/41 |
| 7,129,659 B2* | 10/2006 | Buma et al. | 318/432 |
| 7,207,574 B2* | 4/2007 | Gradu et al. | 280/5.511 |
| 2002/0161500 A1* | 10/2002 | Mase et al. | 701/41 |
| 2002/0180167 A1* | 12/2002 | Schmidt et al. | 280/5.511 |
| 2005/0179220 A1* | 8/2005 | Yasui et al. | 280/5.506 |
| 2005/0264247 A1* | 12/2005 | Buma et al. | 318/432 |
| 2006/0249919 A1* | 11/2006 | Suzuki et al. | 280/5.511 |

FOREIGN PATENT DOCUMENTS

| | | |
|---|---|---|
| JP | 11-263113 A | 9/1999 |
| JP | 2000-071738 A | 3/2000 |
| JP | 2000-071739 A | 3/2000 |
| JP | 2002-518245 A | 6/2002 |
| JP | 2003-519588 A | 6/2003 |

OTHER PUBLICATIONS

International Search Report dated Apr. 19, 2005.
Supplementary European Search Report dated Nov. 5, 2007.

* cited by examiner

STABILIZER CONTROL APPARATUS

TECHNICAL FIELD

The present invention relates to a stabilizer control apparatus for a vehicle, and more particularly to a stabilizer control apparatus for controlling a torsional rigidity of a stabilizer disposed between a right wheel and a left wheel, by means of an electrically operated actuator.

BACKGROUND ART

In general, a stabilizer control apparatus for a vehicle is adapted to apply an appropriate roll moment to the vehicle from outside thereof according to an action of a stabilizer, while the vehicle is traveling with a turning operation, to reduce or restrain a rolling motion of a vehicle body. In order to achieve this function, in Non-Patent document 1 as cited hereinafter, for example, a system called "Dynamic Drive" has been proposed to stabilize the rolling motion of the vehicle actively by making use of hydraulic pressure. That is, a tandem pump actuated by an engine is used as a power source, and sensor signals·CAN signal are input, so that a lateral kinetic signal is determined on the basis of logical or mathematical combination of those signals. On the basis of those signals, a proportional pressure control valve for setting an active pressure and a directional control valve for ensuring the direction of oil are controlled. Two pressure sensors for front and rear axle stabilizers are provided in a valve block, and the detected pressures are fed back to a control unit, in the same manner as the direction control valve.

Although the above-described stabilizer control apparatus utilizes a hydraulic pressure in the Patent document 1 as described below, for example, there is proposed a side roll stabilizing apparatus provided with the stabilizer bars divided into two portions and an electromechanical slewing actuator arranged between halves of the stabilizer bars. That is, in the Patent document 1, the electromechanical slewing actuator which is used for creating an initial stress torque, is constituted by three basic components, namely an electric motor, a step-down gear and a brake disposed between them. The torque generated by the electric motor is converted by the step-down gear into the torque needed for the initial stress of the stabilizer. One stabilizer half is supported directly by the electromechanical slewing actuator or housing via a bearing mount, and the other stabilizer half is connected to the output end (high torque end) of the step-down gear and is mounted in the bearing mount.

Patent document 1:
Japanese Patent Laid-open Publication No. 2002-518245
Non-Patent document 1:
Dynamic Drive. Technology. [online]. BMW Group, 2002. [retrieved on 2003-12-08]. Retrieved from the Internet: <URL:http://www.bmwgroup.com/e/0_0_www_bmw-group_com/7_innovation/7_3_technologie/7_3_4_dynamic_drive.shtml>

DISCLOSURE OF THE INVENTION

Problems to be Solved by the Invention

In Non-Patent document 1 as cited above, it is described that "In lateral acceleration between 0 to 0.3 g, no relative roll angles occur (100% reduction). In lateral acceleration of 0.6 g, the reduction is 80%. Up to 0.6 g, Dynamic Drive generates quasi-stationary roll behavior", wherein "g" is a gravity acceleration, generally represented by "G". This description means that according to increase of lateral acceleration, i.e., increase of inertia force acting on a vehicle body, a degree capable of reducing a roll angle of a vehicle body becomes small. Provided that an output of the control apparatus is enough to control the rolling motion of the vehicle body, the roll angle of the vehicle body could be reduced up to 100%, even if the lateral acceleration is high. However, such a high output control apparatus as described above can not be formed as a product in terms of its size and cost. Therefore, as for the stabilizer control apparatus, it is considered to be conventional to have such a structure that the roll angle of the vehicle body actively reduced up to a predetermined lateral acceleration, and in a range of lateral acceleration equal to or higher than that, a torsion spring characteristic inherently owned by the stabilizer bar is provided.

On the other hand, as for the apparatus for utilizing the electric motor as the power source as described in the Patent document 1, it is characterized in that its turning actuator is an electromechanical turning actuator and that it is provided with means for locking turning displacement of a half portion of the stabilizer in the opposite direction. However, providing such locking means results in enlarging a longitudinal size of the stabilizer control apparatus, so that it is extremely disadvantageous to be mounted on the vehicle.

Therefore, according to the stabilizer control apparatus provided with an actuator having an electric motor and a speed reducing mechanism, it is an object of the present invention to provide a small-sized stabilizer control apparatus for actively restraining a roll of a vehicle body, within an output range of the electric motor, and certainly providing a torsion spring characteristic inherently owned by the stabilizer bar, if it has come to be out of the output range.

Means for Solving the Problems

To solve the above-mentioned problems, according to the present invention, as a first embodiment, in a stabilizer control apparatus comprising a stabilizer including a pair of stabilizer bars disposed between a right wheel and a left wheel of a vehicle, and an actuator having an electric motor and a speed reducing mechanism disposed between said pair of stabilizer bars, and control means for controlling said electric motor in response to a turning state of said vehicle, to control a torsional rigidity of said stabilizer, it is so constituted that the inverse of the product of a normal efficiency and a reverse efficiency of said speed reducing mechanism is equal to or greater than 1.17 and equal to or smaller than 3.75, and that said control means controls an output of said electric motor to be held or reduced, when the turning state has come to be out of such a range that a rolling motion of a vehicle body can be actively controlled.

Also, according to the present invention, as a second embodiment, in a stabilizer control apparatus comprising a stabilizer including a pair of stabilizer bars disposed between a right wheel and a left wheel of said vehicle, and an actuator having an electric motor and a speed reducing mechanism disposed between said pair of stabilizer bars, control means for controlling said electric motor in response to a turning state of said vehicle, to control a torsional rigidity of said stabilizer, steering angle detection means for detecting a steering angle of said wheels, vehicle speed detection means for detecting a vehicle speed of said vehicle, lateral acceleration detection means for detecting an actual lateral acceleration of said vehicle, and lateral acceleration calculating means for calculating a lateral acceleration on the basis of the results detected by said vehicle speed detection means and said steering angle detection means, it may be so constituted that said control means controls said electric motor on the basis of at least one of the calculated lateral acceleration calculated by said lateral acceleration calculating means and the detected actual lateral acceleration detected by said lateral acceleration detection means, to control the torsional rigidity of said stabilizer, and that said control means holds an output of said electric motor to perform a holding control, in the case where the turning state has come to be out of such a range that a rolling motion of a vehicle body can be actively controlled, and sets values of the acceleration obtained when said holding control starts and a normal efficiency and a reverse efficiency of said speed reducing mechanism, to provide such a value that the lateral acceleration obtained when said holding control starts, is multiplied by the inverse of the product of the normal efficiency and the reverse efficiency of said speed reducing mechanism, to be equal to or greater than the lateral acceleration obtained in response to a turning limit of said vehicle.

Or, as a third embodiment, in a stabilizer control apparatus comprising a stabilizer including a pair of stabilizer bars disposed between a right wheel and a left wheel of said vehicle, and an actuator having an electric motor and a speed reducing mechanism disposed between said pair of stabilizer bars, control means for controlling said electric motor in response to a turning state of said vehicle, to control a torsional rigidity of said stabilizer, steering angle detection means for detecting a steering angle of said wheels, vehicle speed detection means for detecting a vehicle speed of said vehicle, lateral acceleration detection means for detecting an actual lateral acceleration of said vehicle, and lateral acceleration calculating means for calculating a lateral acceleration on the basis of the results detected by said vehicle speed detection means and said steering angle detection means, it may be so constituted that said control means controls said electric motor on the basis of at least one of the calculated lateral acceleration calculated by said lateral acceleration calculating means and the detected actual lateral acceleration detected by said lateral acceleration detection means, to control the torsional rigidity of said stabilizer, and that said control means reduces an output of said electric motor to perform a reducing control, in the case where the turning state has come to be out of such a range that a rolling motion of a vehicle body can be actively controlled, and sets values of the acceleration and a normal efficiency and a reverse efficiency of said speed reducing mechanism provided when said reducing control starts, to provide such a value that the lateral acceleration obtained when said reducing control starts, is multiplied by the inverse of the product of the normal efficiency and the reverse efficiency of said speed reducing mechanism, to be equal to or greater than the lateral acceleration obtained in response to a turning limit of said vehicle.

In the stabilizer control apparatus as described in the above-described second and third embodiments, the values of the normal efficiency and the reverse efficiency of said speed reducing mechanism may be set to be within such a range that the inverse of the product of the normal efficiency and the reverse efficiency of said speed reducing mechanism is equal to or greater than 1.17 and equal to or smaller than 3.75.

EFFECTS OF THE INVENTION

Consequently, in the stabilizer control apparatus according to the first embodiment of the present invention, it is so constituted that the speed reducing mechanism with the inverse of the product of the normal efficiency and the reverse efficiency being equal to or greater than 1.17 and equal to or smaller than 3.75 is used, and that the output of the electric motor is controlled to be held or reduced, when the turning state has come to be out of the range that the rolling motion of the vehicle body can be actively controlled. Therefore, by means of a small-sized actuator, the stabilizer control can be accurately performed such that the roll of the vehicle body can be actively restrained within the output range of the electric motor, and the torsion spring characteristic inherently owned by the stabilizer bar can be certainly provided, if it has come to be out of the output range, and consumption of the electric power can be reduced.

Furthermore, if it is so constituted as the second or third embodiment, at the outset, the values of the normal efficiency and the reverse efficiency of the speed reducing mechanism are set to be the predetermined values, on the basis of which the lateral acceleration can be set appropriately when the holding control or reducing control of the electric motor starts. The values of the normal efficiency and the reverse efficiency of the speed reducing mechanism may be set such that the inverse of the product of them is equal to or greater than 1.17 and equal to or smaller than 3.75.

DESCRIPTION OF CHARACTERS

SBf: front stabilizer
SBfr, SBfl: front stabilizer bar
SBr: rear stabilizer
FT,RT: stabilizer actuator
SW: steering wheel
SA: steering angle sensor
WHfr, WHfl, WHrr, WHrl: vehicle wheel
WSfr, WSfl, WSrr, WSrl: wheel speed sensor
YR: yaw rate sensor
XG: longitudinal acceleration sensor
YG: lateral acceleration sensor
ECU: electronic controller

BEST MODE FOR CARRYING OUT THE INVENTION

Figure 1:
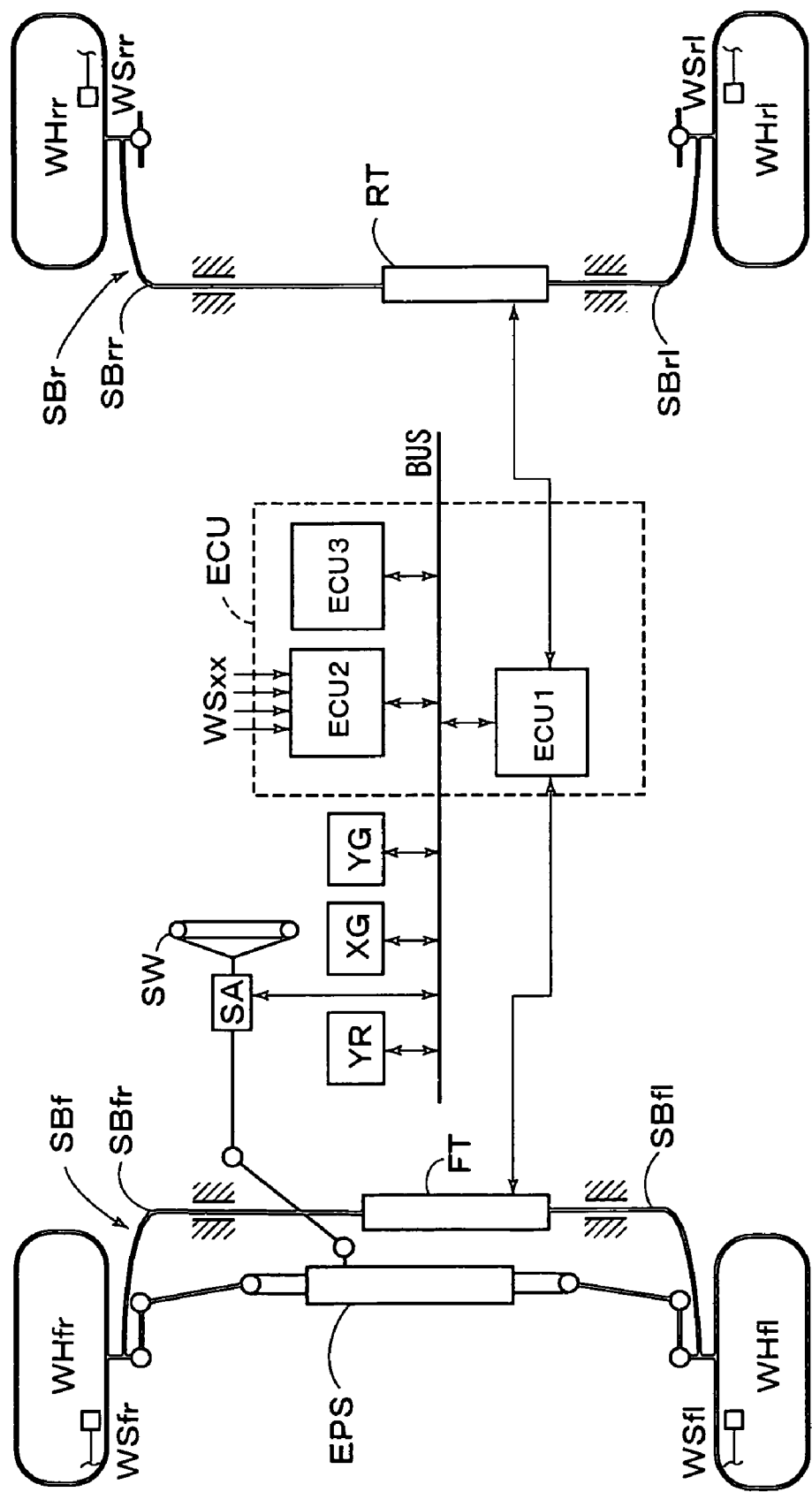
FIG. 1 is a schematic structural figure of a vehicle having a stabilizer control apparatus according to an embodiment of the present invention.

Hereinafter, will be explained a desirable embodiment of the present invention. In FIG. 1, there is shown overall structure of a vehicle with a stabilizer control apparatus according to an embodiment of the present invention. A front stabilizer SBf and a rear stabilizer SBr are disposed to act as a torsion spring when a motion in a rolling direction is applied to a vehicle body (not shown). As for the front stabilizer SBf and rear stabilizer SBr, each torsional rigidity of them is adapted to be controlled by stabilizer actuators FT and RT to be varied, so as to restrain a roll angle of the vehicle body resulted from the rolling motion of the vehicle body. The stabilizer actuators FT and RT are controlled by a stabilizer control unit ECU1 provided in an electronic controller ECU.

As shown in FIG. 1, at each wheel WHxx of the vehicle, there is provided a wheel speed sensor WSxx ("xx" designates each wheel, i.e., "fr" designates the wheel at the front right side, "fl" designates the wheel at the front left side, "rr" designates the wheel at the rear right side, and "rl" designates the wheel at the rear left side), which is connected to the electronic controller ECU, and by which a signal having pulses proportional to a rotational speed of each wheel, i.e., a wheel speed, is fed to the electronic controller ECU. Furthermore, a steering angle sensor SA for detecting a steering angle (handle angle) δf of a steering wheel SW, a longitudinal acceleration sensor XG for detecting a longitudinal acceleration Gx of the vehicle, a lateral acceleration sensor YG for detecting a lateral acceleration Gy of the vehicle, a yaw rate sensor YR for detecting a yaw rate Yr of the vehicle, and the like are electrically connected to the electronic controller ECU.

In the electronic controller ECU, in addition to the stabilizer control unit ECU1 as described above, a brake control unit ECU2, steering control unit ECU3 and the like are constituted, and these control units ECU 1-3 are connected to a communication bus, through a communication unit (not shown) provided with CPU, ROM and RAM for communication. Therefore, the information required for each control system can be fed from other control systems.

Figure 2:
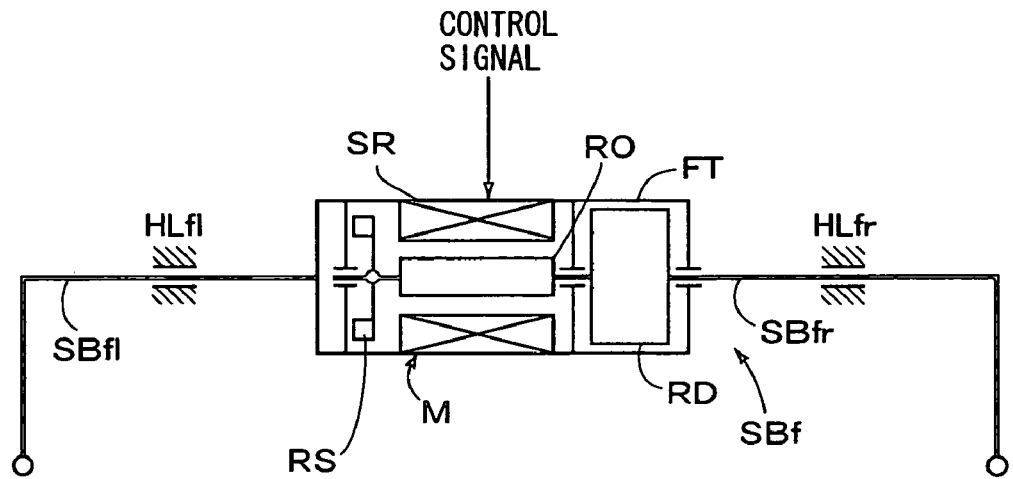
FIG. 2 is a structural figure showing a practical structural example of a stabilizer actuator according to an embodiment of the present invention.

FIG. 2 shows a practical constitutional example of the stabilizer actuator FT (also, RT is constituted in the same manner), wherein the front stabilizer SBf is divided into a pair of right and left stabilizer bars SBfr and SBfl, one end of each bar is connected to a right or left wheel, and the other end of one bar is connected to a rotor RO of an electric motor M through a speed reducing mechanism RD, and the other end of the other one bar is connected to a stator SR of the electric motor M. The stabilizer bars SBfr and SBfl are held on the vehicle body by holding members HLfr and HLfl. Consequently, when the electric motor M is energized, torsion force is created on each of the divided stabilizer bars SBfr and SBfl, so that apparent torsion spring characteristic of the front stabilizer SBf is changed, whereby the roll rigidity of the vehicle body is controlled. A rotational angle sensor RS is disposed in the stabilizer actuator FT, to act as rotational angle detection means for detecting a rotational angle of the electric motor M.

Herein, will be explained a background of the present invention as described before, referring to FIGS. 3-6 in more detail. The stabilizer control apparatus according to the present invention is provided with the stabilizer actuator FT (and RT) which uses the electric motor M as a power source as described above, and makes the power transmission through the speed reducing mechanism RD having a normal efficiency and a reverse efficiency.

Figure 3:
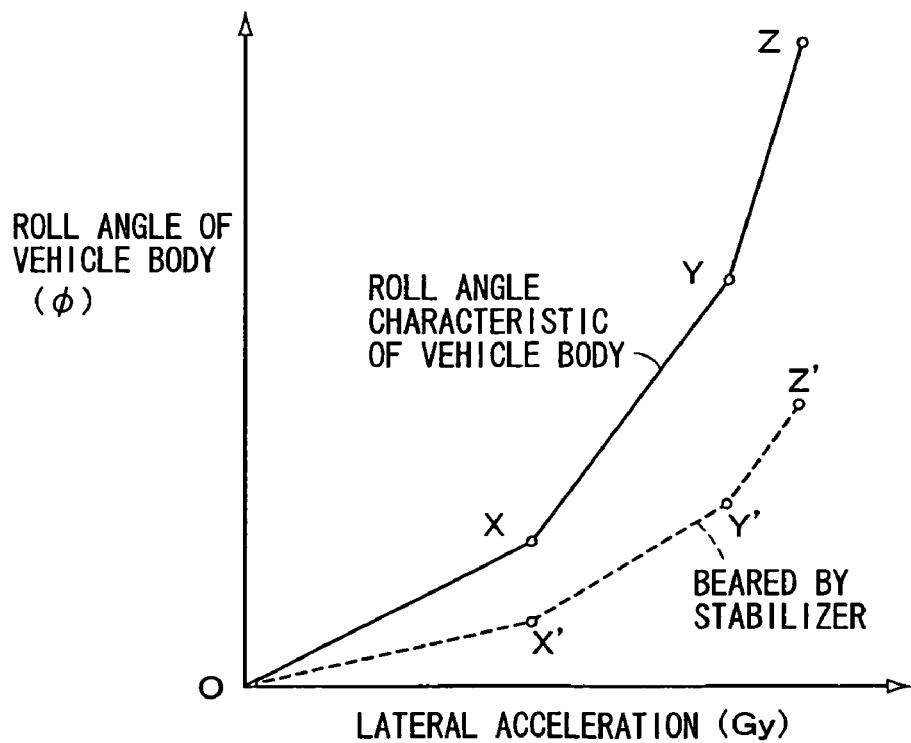
FIG. 3 is a graph showing an example of a relationship between a lateral acceleration and a roll angle of a vehicle body, in the case where output of an electric motor will not cover all range of an active roll restraining control according to an embodiment of the present invention.

At the outset, in order to study a characteristic between the output of the electric motor M and the roll angle of the vehicle body, with the efficiency of the speed reducing mechanism RD being taken into consideration, there are shown in FIG. 3 a relationship between the lateral acceleration Gy (inertia force acting on the vehicle body) and roll angle φ of the vehicle body. According to a regular rolling motion, the vehicle body is supported by spring elements mounted on each wheel of the vehicle (helical spring, leaf spring, air spring or the like) and the stabilizer. As a range O-X (O designates an origin) is within a range of output of the electric motor, a torsion spring constant (may be called as a torsional rigidity) increases, then, a varying rate of the roll angle φ of the vehicle body (rolling rate) relative to the lateral acceleration Gy is reduced. In a range X-Y, the stabilizer is locked to provide such a torsional rigidity that is inherently provided on the stabilizer, i.e., the torsional rigidity provided in such a state that the stabilizer bar divided into two portions (e.g., the above-mentioned SBfr and SBfl) is fixed, on the basis of the reason as described later. Furthermore, in a range Y-Z, contrary to the range O-X, the electric motor M is rotated so as to return the torsion of the stabilizer bar by the inertia force acting on the vehicle body. Therefore, the torsional rigidity of the stabilizer decreases, whereas the roll angle of the vehicle body increases.

Figure 4:
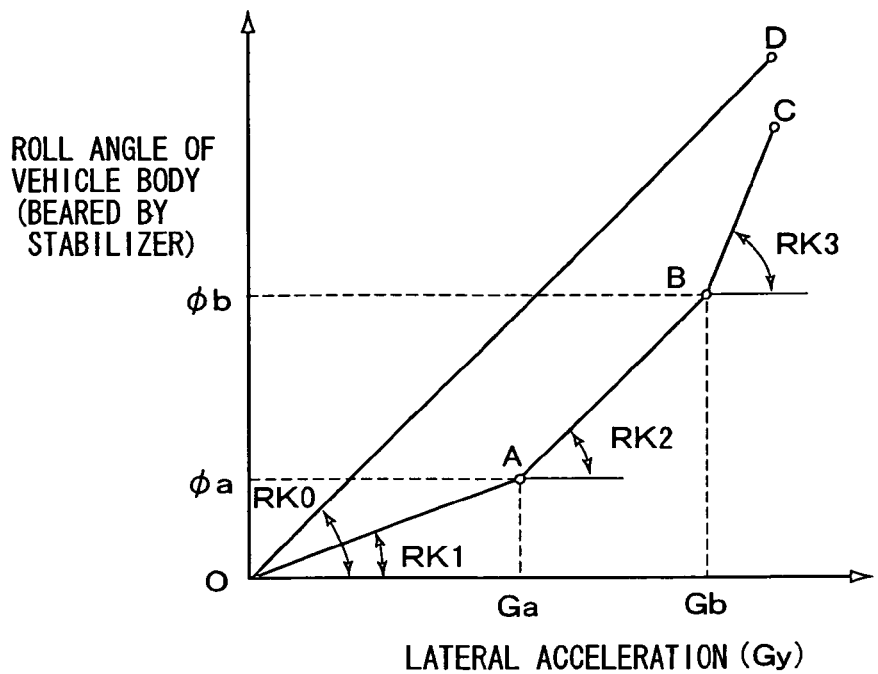
FIG. 4 is a graph showing briefly a relationship between a lateral acceleration and a roll angle of a vehicle body as shown in FIG. 3.
Figure 5:
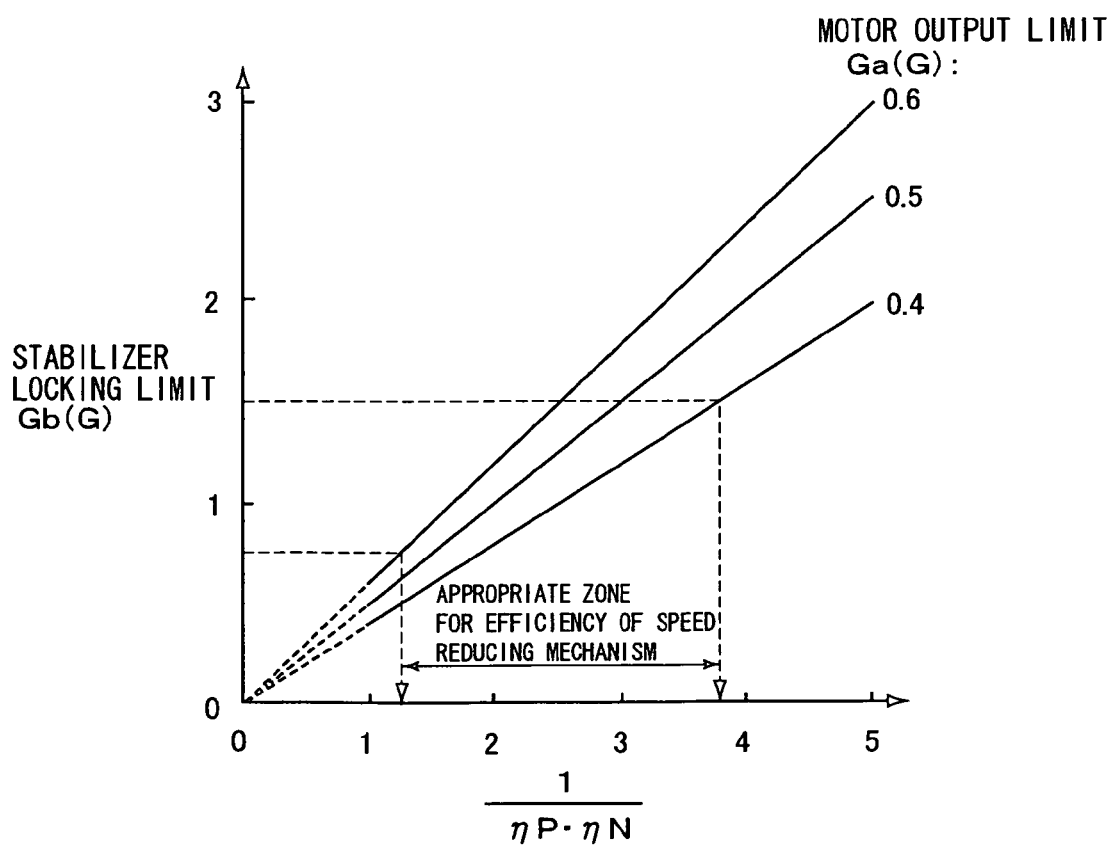
FIG. 5 is a graph showing an example of setting an appropriate range for a speed reducing mechanism efficiency on the basis of an output limit of an electric motor.

FIG. 4 shows the relationship between the lateral acceleration Gy and the roll angle φ of the vehicle body, which is provided for a simplified structure supported only by the stabilizer, without the above-described spring elements as shown in FIG. 3, and which is divided into three ranges. At the outset, [a range 1 with the lateral accelerations 0-Ga] corresponds to [a range capable of performing an active control of the rolling motion of the vehicle body within the range of the output of the electric motor (the range capable of performing the active roll restraining control)], so that the relationship of rolling rate is [RK1<RK0]. Next, [a range 2 with the lateral accelerations (Ga-Gb)] corresponds to [a range in which the electric motor is held and the relative displacement of the divided stabilizer bars is locked, to provide a passive characteristic of torsional rigidity for the stabilizer (the range for providing the torsional rigidity when the divided stabilizer bars are fixed)], so that the relationship of rolling rate is [RK2=RK0]. And, [a range 3 with the lateral acceleration equal to or greater than (Gb)] corresponds to [a range in which the electric motor is forced to be returned by the external force (inertia force acting on the vehicle body), to reduce the torsional rigidity of the stabilizer], so that the relationship of rolling rate is [RK3>RK0]. Herein, the rolling rate corresponds to a varying rate of the roll angle φ of the vehicle body to the lateral acceleration Gy as described above, and K0 indicates the rolling rate for the torsion spring characrteristic obtained when the divided stabilizer bars (e.g., SBfr and SBfl) are fixed.

Next will be explained a characteristic of "O-A-B-C" as shown in FIG. 4, which is provided when the efficiency of the speed reducing mechanism RD is taken into consideration. In this case, the efficiency (normal efficiency) of the electric motor M with the power being transmitted to the stabilizer bars SBfr and SBfl through the speed reducing mechanism RD is represented by ηP, whereas the efficiency (reverse efficiency) of the electric motor M, which is returned by the force input from the stabilizer bars SBfr and SBfl through the speed reducing mechanism RD, is represented by ηN. With respect to a balance between the output torque Tma of the electric motor M (converted into roll moment) and a roll moment Tra resulted from the inertia force (lateral acceleration) acting on the vehicle body at the intersection A between the range 1 and the range 2, the range 1 is included in the range capable of providing the output from the electric motor M. Therefore, it is the range, in which the electric motor M transmit the power to the stabilizer bars SBfr and SBfl, to satisfy the following equation (1).

$$Tra = Tma \cdot \eta P \quad (1)$$

On the contrary, with respect to a balance between the output torque Tmb of the electric motor M (converted into a roll moment) and a roll moment Trb resulted from the inertia force (lateral acceleration) at the intersection B between the range 2 and the range 3, the range 3 is included in the range with the electric motor M returned by the inertia force of the vehicle body, to satisfy the following equation (2).

$$Trb = Tmb \cdot \eta N \quad (2)$$

With the active roll restraining control performed to restrain the roll angle of the vehicle body actively, the output torque of the electric motor M is increased in response to increase of the turning state (lateral acceleration), so as to hold the output torque of the electric motor M at the point A (output limit of the electric motor M), then the output of the electric motor M will be controlled to provide [Tma=Tmb]. As a result, the following equation (3) can be obtained by the equations (1) and (2) as described above.

$$Trb = Tra / (\eta P \cdot \eta N) \quad (3)$$

As the roll moment resulted from the inertia force of the vehicle body is approximately proportional to the lateral acceleration, the following equation (4) can be obtained by the equation (3), where the lateral accelerations obtained at the positions A and B are indicated by Ga and Gb, respectively.

$$Gb = Ga \cdot \{1/(\eta P \cdot \eta N)\} \quad (4)$$

Therefore, in such a range that the electric motor M is capable of producing the torque output (range for performing the active roll restraining control), the active roll restraining control is performed. Furthermore, if the turning state (lateral acceleration) is increased further, and exceeds the lateral acceleration Ga, which corresponds to the limit of the motor torque output (as indicated by the point A in FIG. 4), then the electric motor M will be controlled to hold its output. And, the lateral acceleration Gb (corresponds to the point B in FIG. 4, hereinafter, it is called as a stabilizer locking limit) where the electric motor M is to be reversed by the inertia force acting on the vehicle body can be obtained by holding the lateral acceleration corresponding to the limit of the motor torque output by the inverse of the product of the normal efficiency and the reverse efficiency of the speed reducing mechanism RD. Therefore, by holding the output from the electric motor M, on the basis of the relationship between the normal efficiency, which is required when the electric motor M applies the torsion to the stabilizer bars SBfr and SBfl, and the reverse efficiency, which is required when the electric motor M is returned by the inertia force of the vehicle body, the relative displacement of the stabilizer bars SBfr and SBfl is locked in the range A-B as shown in FIG. 4.

According to a general mechanical design, the higher the efficiency of the speed reducing mechanism is, the smaller the output of the electric motor can be designed. Therefore, it is desirable that the speed reducing mechanism is high in its efficiency. Also, there is a certain correlation between the normal efficiency and the reverse efficiency such that if the normal efficiency is high, the reverse efficiency is high, as well. However, according to the present invention, it is necessary to consider that the electric motor is forced not to be returned by the external force (inertia force acting on the vehicle body). Therefore, it is necessary to design or select the speed reducing mechanism of appropriate characteristics of the normal efficiency and the reverse efficiency.

Figure 13:
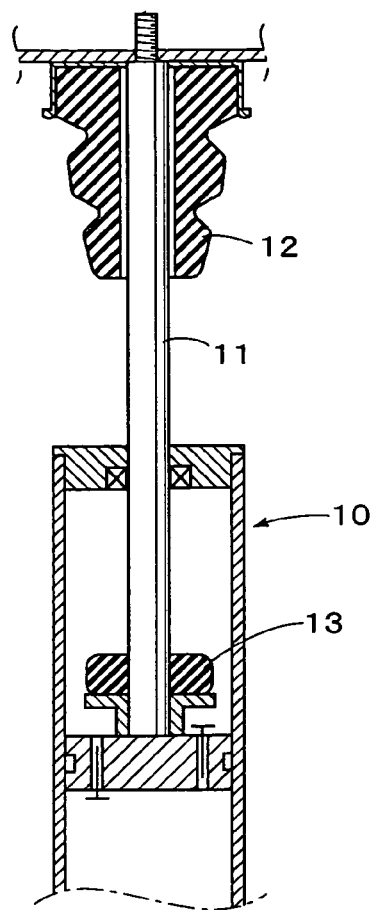
FIG. 13 is a sectional view of an example of a shock absorber for use in an embodiment of the present invention.
Figure 14:
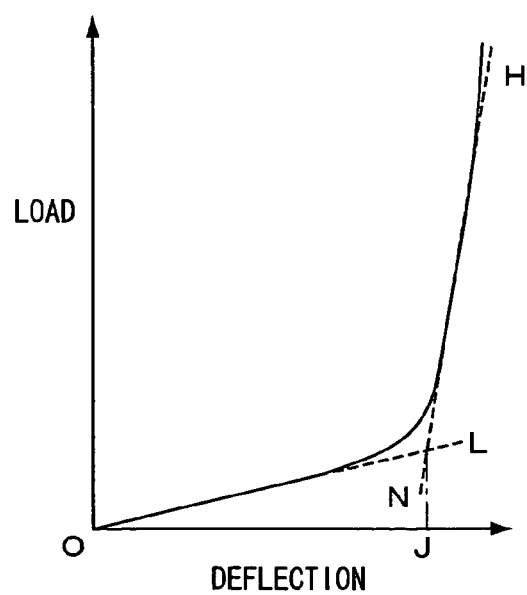
FIG. 14 is a graph showing an example of a deflection-load characteristic of a bound-stopper or rebound-stopper for a shock absorber as shown in FIG. 13.

It is desirable that the stabilizer locking limit Gb is set to be equal to or greater than the lateral acceleration (lower limit value) corresponding to the turning limit of the vehicle, to avoid such a phenomenon that the rolling motion of the vehicle actually increases. The lateral acceleration corresponding to the turning limit of the vehicle can be set to be a maximal lateral acceleration, at which the vehicle is capable of turning operation, and which is determined on the basis of a frictional characteristic of a tire. Also, it can be set to provide such a lateral acceleration that the vehicle body abuts on the bound-stopper 12 or rebound-stopper 13 of the shock absorber 10 as shown in FIG. 13, at the turning limit of the vehicle. These bound-stopper 12 and rebound-stopper 13 are such members that are formed with a resilient body such as rubber or the like, and disposed around the rod 11 as shown in FIG. 13, and adapted to absorb a shock caused when a suspension stroke reaches its limit. Depending on vehicles, it may be designed to abut on the bound-stopper 12 or rebound-stopper 13 with a small suspension stroke, to assist a suspension spring (not shown). In this case, in order to distinguish the turning limit of the vehicle, in a deflection-load characteristic of the bound-stopper 12 or rebound-stopper 13 as shown in FIG. 14, it is possible to set the lateral acceleration to provide the deflection at an intersection (J) between a low spring characteristic (O-L) and a high spring characteristic (N-H), as the turning limit of the vehicle.

Considering the general frictional characteristic of the tire and suspension characteristic, it is desirable to set $Gb \geq 0.7$ G, because the lower limit value of the lateral acceleration corresponding to the turning limit of the vehicle is approximately 0.7 G. As setting the lateral acceleration Gb to be greater than that is required results in setting the efficiency of the speed reducing mechanism to be low, it is necessary to select an electric motor larger in size. Therefore, even if the stabilizer locking limit is set with a sufficient feasibility, it is appropriate to set the lateral acceleration Gb up to approximately 1.5 G. Furthermore, the range of the active roll restraining control is enough to include such a turning state a little larger than the normal traveling, in view of a frequency of the performance, so that it is desirable that the lateral acceleration Ga is set to be in a range of 0.4 G-0.6 G. The relationship in this case is illustrated according to the equation (4), the appropriate range of efficiency of the speed reducing mechanism (normal efficiency and reverse efficiency) is $1/(\eta P \cdot \eta N)$ as shown FIG. 5, so that the range is $1.17 \leq \{1/(\eta P \cdot \eta N)\} \leq 3.75$.

As practical examples for setting the above-mentioned lateral accelerations Ga and Gb, and $1/(\eta P \cdot \eta N)$, therefore, in such a case that the lateral acceleration Gb at the stabilizer locking limit is set to be in the range for providing sufficient feasibility relative to the lateral acceleration limit of the vehicle (for example, Ga=1.2 G), and that the active roll restraining control is set to be in the range of the normal traveling (for example, Ga=0.5 G), then the speed reducing mechanism may be designed or selected so as to satisfy $1/(\eta P \cdot \eta N)$=Gb/Ga=2.4.

On the contrary, it can be constituted such that the speed reducing mechanism is selected at first, and then the lateral accelerations Ga and Gb are designed to be in the appropriate range, on the basis of its efficiency (normal efficiency and reverse efficiency). Accordingly, the value of $1/(\eta P \cdot \eta N)$ can be provided to be larger than the value that is actually required, due to low efficiency of the speed reducing mechanism. In this case, the torque of the electric motor to be held in the region A-B in FIG. 4 is reduced appropriately, so that the locking limit of the stabilizer can be reduced appropriately. The relationship in this case will be explained hereinafter, referring to FIG. 6.

Figure 6:
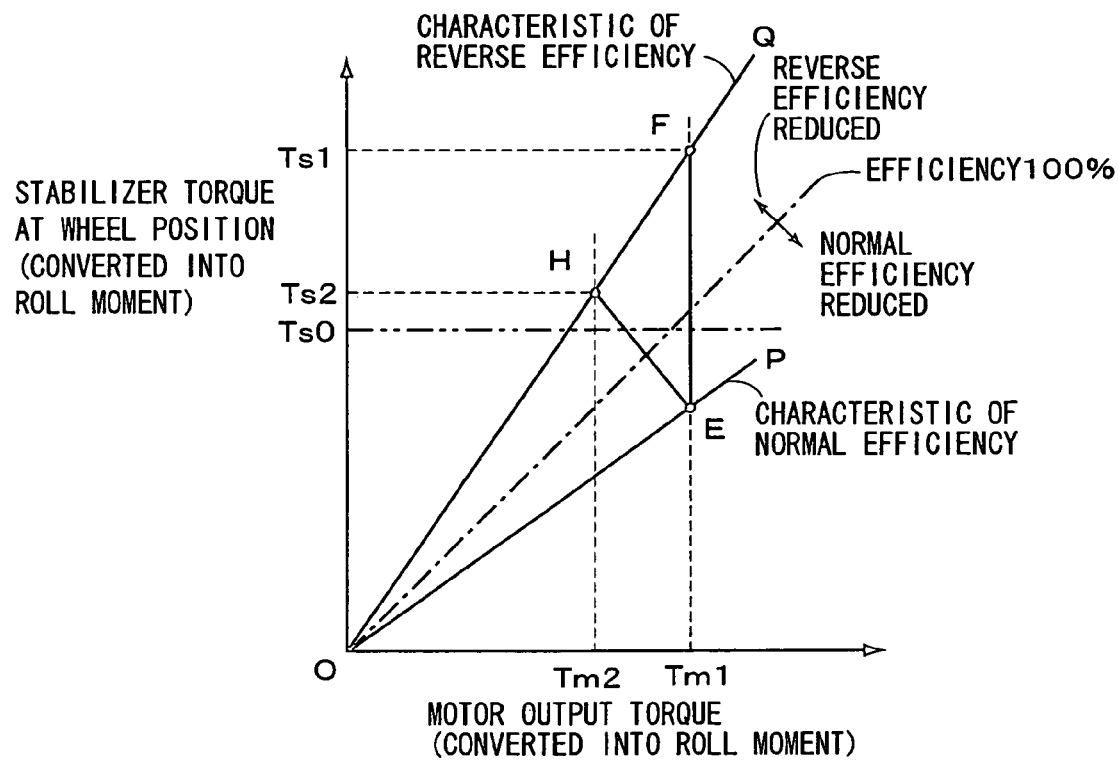
FIG. 6 is a graph showing an example of a relationship between an output torque of an electric motor and a stabilizer torque according to an embodiment of the present invention.

FIG. 6 schematically shows a relationship between a motor output torque and torque applied to both ends of the stabilizer bars connected to the suspension member. Both of the torques indicated on the X-axis and Y-axis are converted into a roll moment around a roll axis of the vehicle body. A range at a lower side to a characteristic line indicative of efficiency 100% of the speed reducing mechanism (one-dot chain line in FIG. 6), i.e., a range surrounded by X-axis and a line indicative of efficiency 100%, is a range where the speed reducing mechanism which actuates power transmission from the electric motor to the vehicle body provides the normal efficiency. On the contrary, a range at an upper side to the characteristic line indicative of efficiency 100% of the speed reducing mechanism, i.e., a range surrounded by Y-axis and a line indicative of efficiency 100%, shows a range where the electric motor is actuated by the inertia force of vehicle body to provide the reverse efficiency of the speed reducing mechanism. It shows that the normal efficiency and reverse efficiency are reduced gradually, with both of them being away from the characteristic line indicative of efficiency 100%, respectively. In FIG. 6, a characteristic of the normal efficiency of an example of the speed reducing mechanism is indicated by O-P and a characteristic of the reverse efficiency is indicated by O-Q.

For example, in the case where the active roll restraining control is performed, so that the motor output torque is held to be Tm1 (corresponding to a point E in FIG. 6) and it is maintained, the locking limit of the stabilizer comes to be a point F. In the case where the stabilizer torque (motor output torque) Ts1 at that time is unnecessarily larger than a lateral acceleration Ts0 corresponding to the vehicle turning limit, due to the low efficiency of the speed reducing mechanism, motor holding torque can be reduced from Tm1 to Tm2, and the locking limit of the stabilizer can be reduced from Ts1 to Ts2 (corresponding to a point H in FIG. 6). Therefore, if the torque holding control to be performed after the locking point of stabilizer is shifted from the active roll restraining control, increase of the temperature in the stabilizer actuator FT and RT or the electric controller ECU can be restrained, and consumption of the electric power by the system can be reduced.

Figure 7:
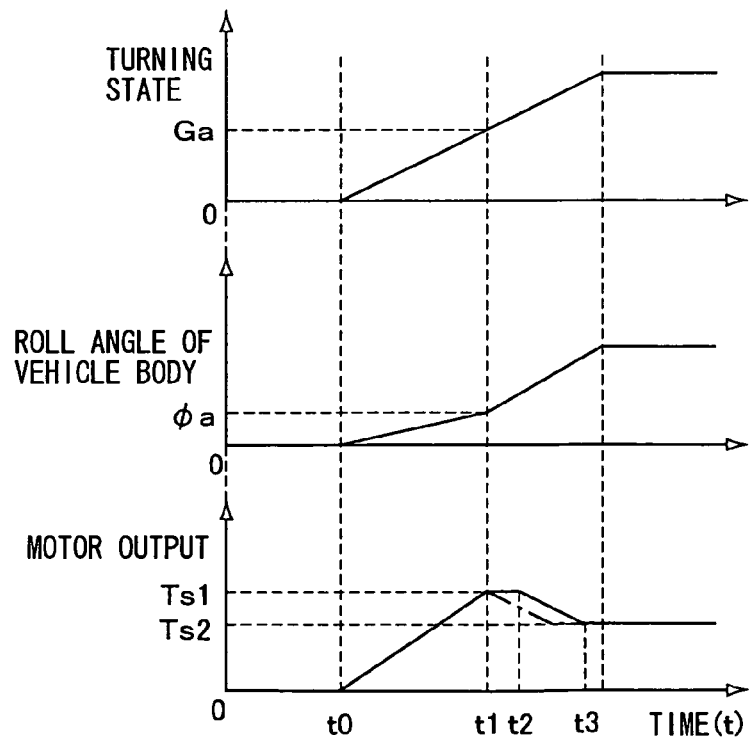
FIG. 7 is a graph showing an example of a relationship between a turning state of a vehicle and a motor output in time series, in the case where an active roll restraining control is performed according to an embodiment of the present invention.

Referring to FIG. 7, will be explained a relationship between the vehicle motion and the motor output shown in time series, when the above-described control is performed. At a time t0, a turning operation of the vehicle begins according to a steering operation of the driver, then a torque corresponding to the turning state is output from the electric motor M, whereby the roll angle of the vehicle body is restrained. After the time t1 when the turning state of the vehicle has reached the limit of the range of the active roll restraining control (lateral acceleration Ga, roll angle φa of the vehicle body, in FIG. 7), the motor output torque is held to be Ts1 such that the stabilizer is locked. In the case where the motor output torque becomes larger to the lock of the stabilizer than the value that is required (at the time t2), the motor output torque is reduced until it becomes Ts2, and is held there (at the time of t3). Furthermore, as for the shift of the motor output torque from Ts1 to Ts2, the torque Ts1 is held during a predetermined time period as shown in FIG. 7, and thereafter it can be set to be reduced down to the torque Ts2 with a time gradient. Also, as indicated by one-dot chain line in FIG. 7, after the time t1 when the turning state of the vehicle reaches the limit of the range of the active roll restraining control, the motor output torque can be reduced immediately.

Figure 8:
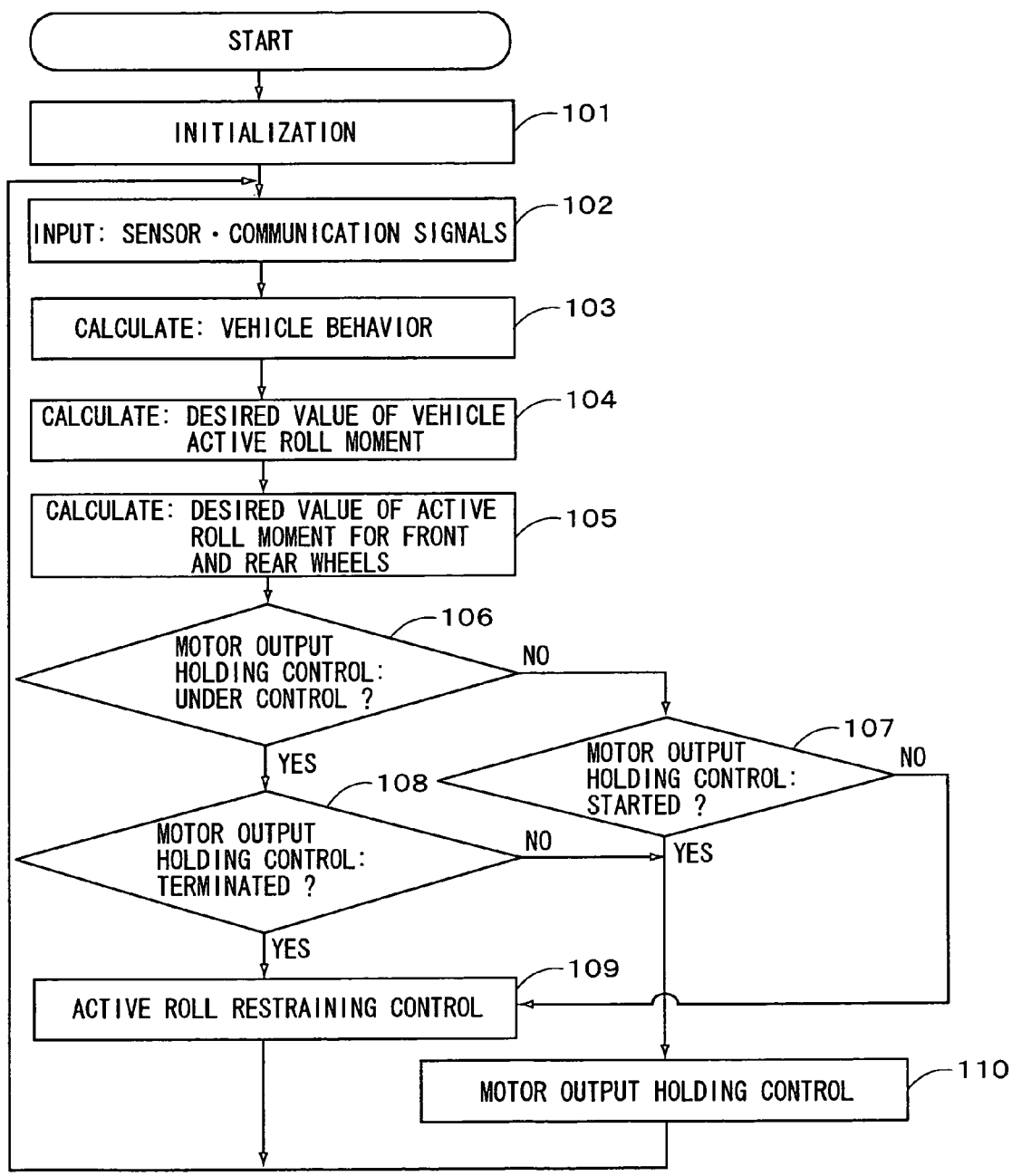
FIG. 8 is a flowchart showing an example of stabilizer control according to an embodiment of the present invention.

FIG. 8 shows a control flow of the stabilizer control apparatus according to the present embodiment. At the outset, an initialization is performed at Step 101, then signals of the rotational angle sensor RS of the electric motor M connected to the stabilizer controller ECU1 (or, a current sensor in the electric controller ECU) are read at Step 102, and further, communication signals are read through the communication bus. And, the program proceeds to Step 103, where the vehicle behavior calculation is performed-to provide a calculated value Gye of the lateral acceleration and a calculated value Yre of the yaw rate on the basis of the vehicle speed Vx and steering angle δf out of those read signals. On the basis of the calculated value and actual sensor value, the desired value of the active roll moment applied to the vehicle is set at Step 104, so as to provide a desirable roll characteristic of the vehicle body. Furthermore, at Step 105, the desired values of the active roll moments of the front and rear wheels are set, on the basis of the desired value of the vehicle active roll moment and roll rigidity ratios of the front and rear wheels. These calculations will be described later.

Next, the program proceeds to Step 106 where it is determined whether the electric motor M is under the output holding control, or not. If the electric motor M is not under the output holding control, the program proceeds to Step 107. Then, if it is determined that a starting sensitivity for the control has not been obtained, or, although the electric motor M is under the output holding control, if it is determined that the terminating condition of the control has been fulfilled at Step 108, the program proceeds to Step 109, where the active roll restraining control is performed to restrain the rolling motion of the vehicle actively on the basis of the desired values of the active roll moments of the front and rear wheels as described before, by means of the stabilizer actuators FT and RT for the front and rear wheels. On the contrary, if the electric motor M is not under the output holding control, and if it is determined that the starting sensitivity of the control has been fulfilled at Step 107, or, although the electric motor M is under the output holding control, if it is determined that the terminating condition of the control has not been fulfilled at Step 108, the program proceeds to Step 110, where the holding control for holding the output of the electric motor M is performed.

The rolling motion of the vehicle is created by the inertia force acting on the vehicle body, which inertia force provides an approximately proportional relation to the turning state of the vehicle. Therefore, the starting determination and terminating determination for the motor output holding control performed at the above-described Steps 107 and 108 can be determined on the basis of the lateral acceleration. For example, in the case where at least one of the sensor detected value and the calculated value of the lateral acceleration read at Step 102 becomes equal to or greater than predetermined value Gd1, the motor output holding control begins, and in the case where at least one of them becomes equal to or smaller than a predetermined value Gd2, the motor output holding control is terminated.

Figure 9:
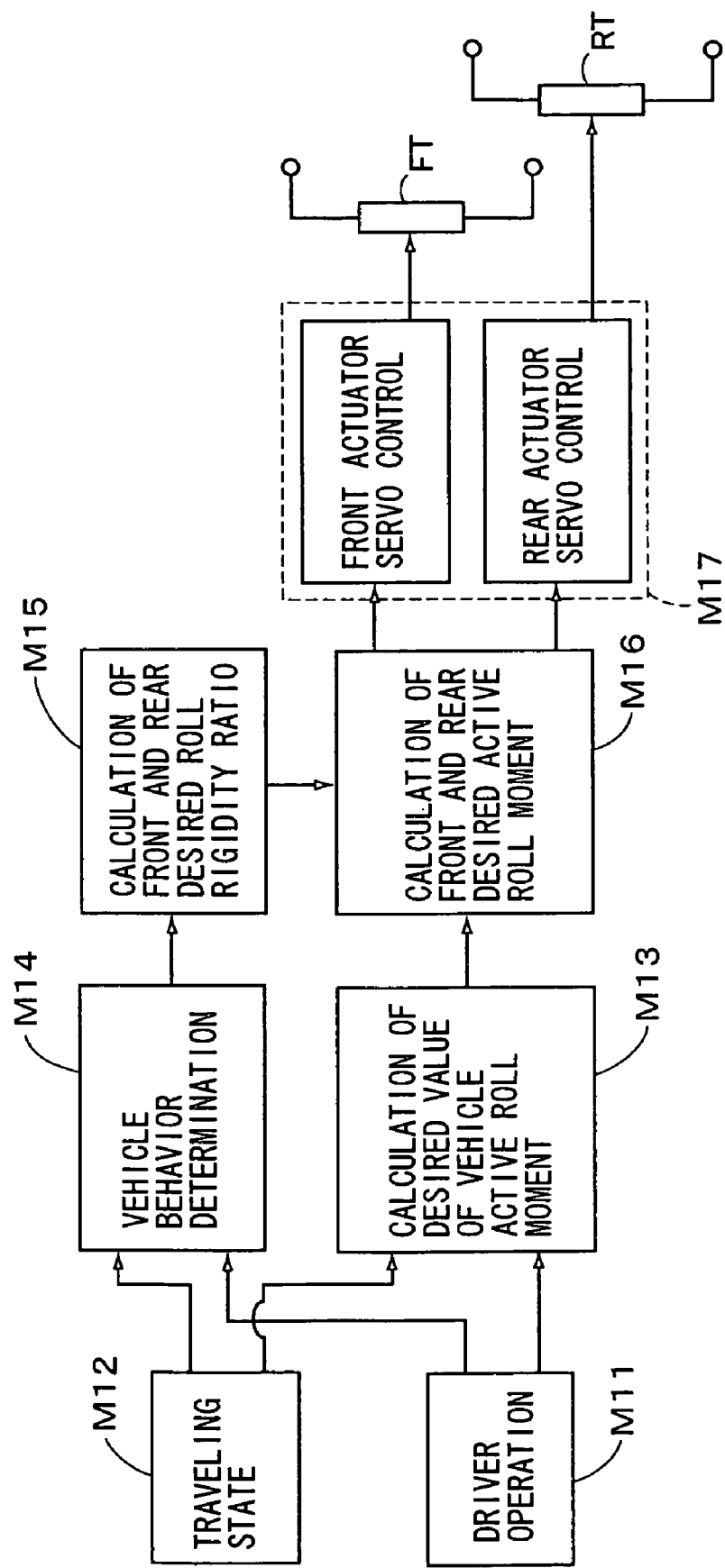
FIG. 9 is a control block diagram showing an outline of an active roll restraining control according to an embodiment of the present invention.

FIG. 9 shows a control block for the active roll restraining control, wherein the information including the steering angle (handle angle) $\delta f$ is detected by vehicle driver operation detection means M11, and wherein vehicle motion variable including the vehicle speed, lateral acceleration and yaw rate are detected by vehicle traveling state detection means M12. On the basis of the detected information, a desired value of vehicle active roll moment is calculated (M13) to achieve a desired rolling characteristic of the vehicle. Also, at a vehicle behavior determination block M14, vehicle steering characteristic (so-called understeer tendency or oversteer tendency) is determined on, the basis of the steering operation by the vehicle driver and the vehicle motion variable. Next, the desired values of the front and rear roll rigidity ratios are calculated (M15) on the basis of the calculated steering characteristic and the vehicle motion variable. Based on the desired values of vehicle active roll moment and the roll rigidity ratios as obtained above, the desired values of active roll moment for the front and rear wheels are calculated (M16). Then, the stabilizer actuators FT and RT are controlled by the actuator servo block (M17).

Figure 10:
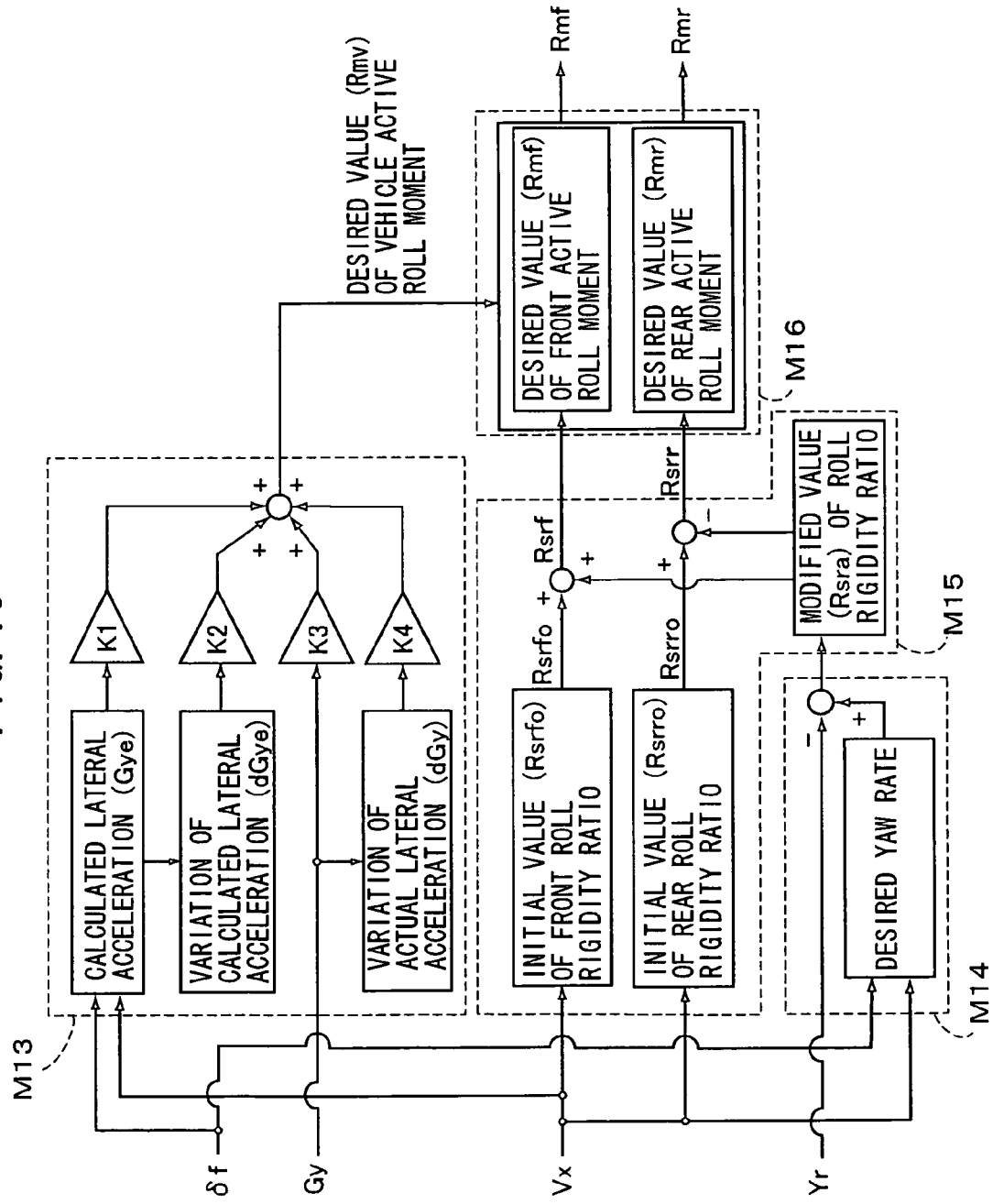
FIG. 10 is a control block diagram of an embodiment of the active roll restraining control as shown in FIG. 9.

FIG. 10 shows a more practical embodiment of the embodiment as shown in FIG. 9, wherein a desired value Rmv of vehicle active roll moment for restraining the rolling motion of the vehicle as a whole is calculated at the desired value of vehicle active roll moment calculation block M13, on the basis of the lateral acceleration Gy detected by the lateral acceleration sensor YG, the variation of the actual lateral acceleration dGy obtained by differentiating the lateral acceleration Gy, the calculated lateral acceleration Gye calculated by the handle angle (steering angle) $\delta f$ and vehicle speed Vx, and the variation of the calculated lateral acceleration dGye obtained by differentiating the calculated lateral acceleration Gye. The calculated lateral acceleration Gye can be obtained by the following equation (5).

$$Gye = (Vx^2 \cdot \delta f) / \{L \cdot N \cdot (1 + Kh \cdot Vx^2)\} \quad (5)$$

where "L" is a wheel base, "N" is a steering gear ratio, and "Kh" is a stability factor.

Consequently, the desired value (Rmv) of active roll moment to be applied to the vehicle as a whole so as to achieve an appropriate rolling characteristic can be obtained by the following equation (6) (K1, K2, K3, K4 are control gains).

$$Rmv = K1 \cdot Gye + K2 \cdot dGye + K3 \cdot Gy + K4 \cdot dGy \quad (6)$$

As described above, the calculated lateral acceleration Gye obtained by the steering angle $\delta f$ and vehicle speed Vx, and its variation dGye are taken into consideration, so as to compensate a delay in calculation or responsibility of the actuator.

Figure 11:
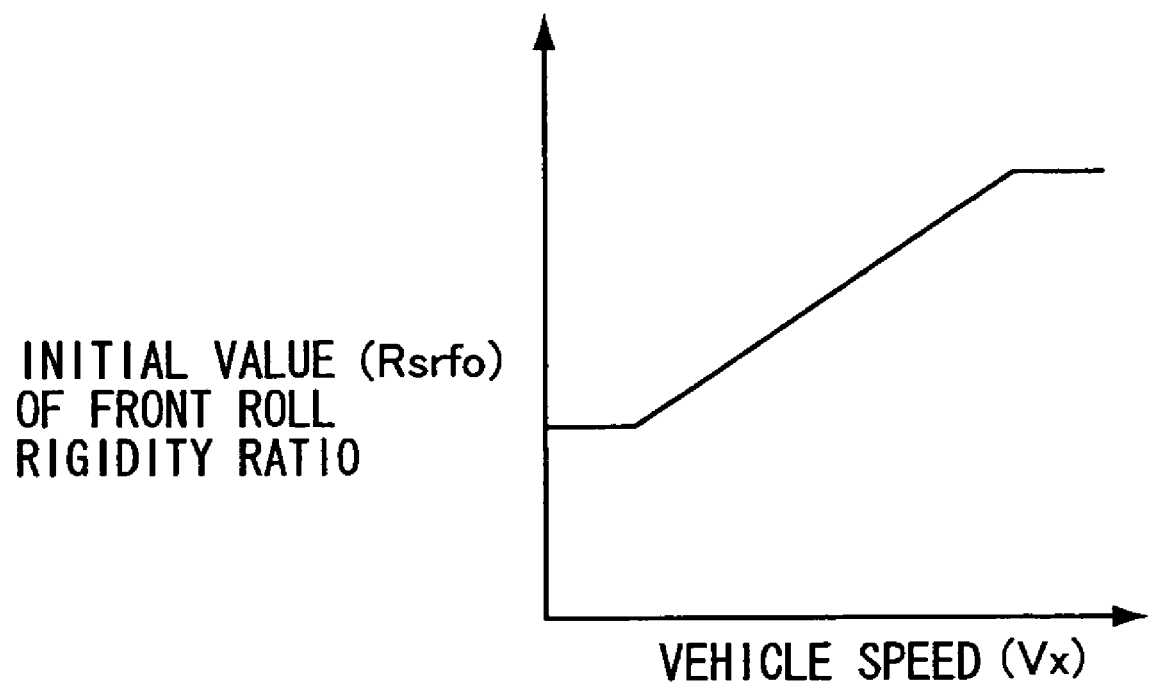
FIG. 11 is a graph showing an example of a map for setting an initial value of a front roll rigidity ratio according to an embodiment of the present invention.

At the front and rear roll rigidity ratio calculation block M15, the desired values of the front and rear roll rigidity ratios are calculated as follows. At the outset, the initial values Rsrfo and Rsrro are set for the front roll rigidity ratio and rear roll rigidity ratio, respectively, on the basis of the vehicle speed Vx. As shown in FIG. 11, the initial value Rsrfo for the front roll rigidity ratio is set to be low when the vehicle is traveling at low speed, whereas it is set to be high when the vehicle is traveling at high speed, thereby to increase the understeer tendency when the vehicle is traveling at high speed. Then, the initial value Rsrro for the rear roll rigidity ratio is set to be (1-Rsrfo). Next, at a vehicle behavior determination block M14, a desired yaw rate Yre is calculated on the basis of the steering angle $\delta f$ and vehicle speed Vx, to determine the vehicle steering characteristic, and then compared with the actual yaw rate Yr to calculate a yaw rate deviation $\Delta Yr$, on the basis of which a modified value Rsra for the roll rigidity ratio is calculated.

As a result, when the vehicle shows the understeer tendency, the front roll rigidity ratio is modified to be decreased, and the rear roll rigidity ratio is modified to be increased. On the contrary, when the vehicle shows the oversteer tendency, the front roll rigidity ratio is modified to be increased, and the rear roll rigidity ratio is modified to be decreased. Then, in a front and rear wheel desired active roll moment value calculation block M16, the desired value Rmf of active roll moment for the front wheel and the desired value Rmr of active roll moment for the rear wheel are calculated, on the basis of the desired value Rmv of vehicle active roll moment, the desired value Rsrf of the front roll rigidity ratio, and the desired value Rsrr of the rear roll rigidity ratio, in accordance with the equations of Rm=Rmv·Rsrf and Rmr=Rmv·Rsrr, respectively. And then, the torsion force to be created at each of the front and rear stabilizer actuators FT and RT is determined on the basis of the desired values Rmf and Rmr of the front and rear roll rigidity ratios, respectively, to control the electric motor M.

Figure 12:
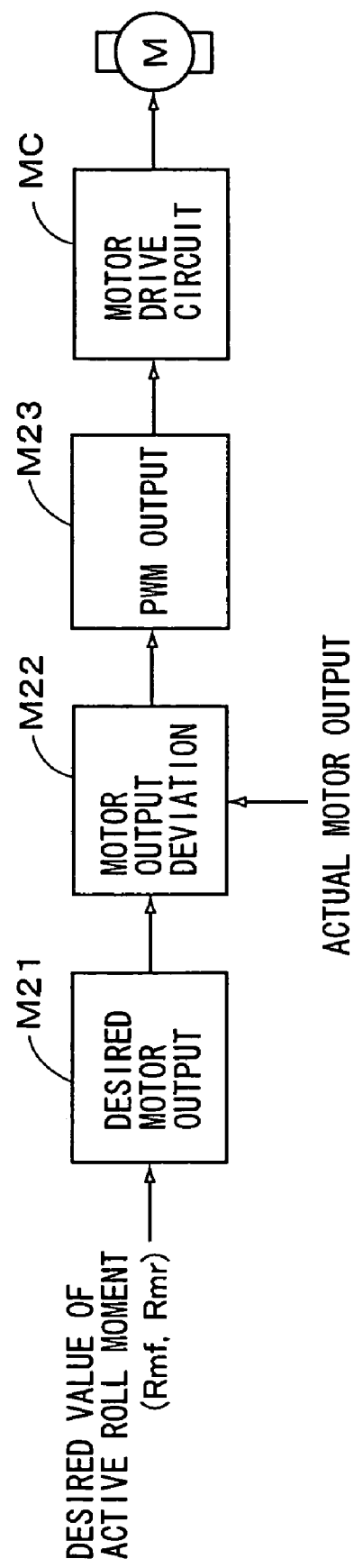
FIG. 12 is a control block diagram of an embodiment actuated by an electric motor according to an embodiment of the present invention.

Next, FIG. 12 shows an embodiment of the actuator servo control block M17 as shown in FIG. 6. Then, on the basis of the desired values Rmf and Rmr of active roll moments of front and rear wheels calculated as described above, the desired value of the motor output is calculated (M21). Then, this desired value of the motor output is compared with an actual motor output, and a deviation of motor output is calculated (M22). Furthermore, in accordance with this deviation, PWM output fed to the electric motor M is determined (M23). And, switching elements in the motor drive circuit MC are controlled by the PWM output, to actuate the electric motor M.

Consequently, in order to control the rolling motion actively in response to the turning state of the vehicle, the active roll moment against the inertia force created in the turning operation is applied. This application of the active roll moment is achieved by applying the torsion force to the stabilizer bars SBfr and SBfl by the aforementioned stabilizer actuator FT, to increase the torsional rigidity of the stabilizer SBf. And, even if the vehicle is under a condition with increasing turning state to exceed the output range of the electric motor M, as the speed reducing mechanism DT is set to provide the appropriate normal and reverse efficiency as described before, increase of the vehicle rolling motion can be controlled certainly, with the output of the electric motor M being held, and without any additional means such as a locking mechanism. Consequently, it is possible to minimize the stabilizer actuators FT and RT which achieve the active roll restraining control. Also, if the electric motor M is so controlled as shown in FIG. 7, it is possible to reduce consumption of the electric power.

The invention claimed is:

1. A stabilizer control apparatus comprising:
   a stabilizer including a pair of stabilizer bars disposed between a right wheel and a left wheel of said vehicle, and an actuator having an electric motor and a speed reducing mechanism disposed between said pair of stabilizer bars;
   control means for controlling said electric motor in response to a turning state of said vehicle, to control a torsional rigidity of said stabilizer;
   steering angle detection means for detecting a steering angle of said wheels;
   vehicle speed detection means for detecting a vehicle speed of said vehicle;
   lateral acceleration detection means for detecting an actual lateral acceleration of said vehicle; and
   lateral acceleration calculating means for calculating a lateral acceleration on the basis of the results detected by said vehicle speed detection means and said steering angle detection means, wherein
   said control means controls said electric motor on the basis of at least one of the calculated lateral acceleration calculated by said lateral acceleration calculating means and the detected actual lateral acceleration detected by said lateral acceleration detection means, to control the torsional rigidity of said stabilizer, and wherein
   said control means holds an output of said electric motor to perform a holding control, in the case where the turning state has come to be out of such a range that a rolling motion of a vehicle body can be actively controlled, and sets values of the acceleration obtained when said holding control starts and a normal efficiency and a reverse efficiency of said speed reducing mechanism, to provide such a value that the lateral acceleration obtained when said holding control starts, is multiplied by an inverse of a product of the normal efficiency and the reverse efficiency of said speed reducing mechanism, to be equal to or greater than the lateral acceleration obtained in response to a turning limit of said vehicle.

2. A stabilizer control apparatus comprising:
   a stabilizer including a pair of stabilizer bars disposed between a right wheel and a left wheel of said vehicle, and an actuator having an electric motor and a speed reducing mechanism disposed between said pair of stabilizer bars;
   control means for controlling said electric motor in response to a turning state of said vehicle, to control a torsional rigidity of said stabilizer;
   steering angle detection means for detecting a steering angle of said wheels;
   vehicle speed detection means for detecting a vehicle speed of said vehicle;
   lateral acceleration detection means for detecting an actual lateral acceleration of said vehicle; and
   lateral acceleration calculating means for calculating a lateral acceleration on the basis of the results detected by said vehicle speed detection means and said steering angle detection means, wherein
   said control means controls said electric motor on the basis of at least one of the calculated lateral acceleration calculated by said lateral acceleration calculating means and the detected actual lateral acceleration detected by said lateral acceleration detection means, to control the torsional rigidity of said stabilizer, and wherein
   said control means reduces an output of said electric motor to perform a reducing control, in the case where the turning state has come to be out of such a range that a rolling motion of a vehicle body can be actively controlled, and sets values of the acceleration and a normal efficiency and a reverse efficiency of said speed reducing mechanism provided when said reducing control starts, to provide such a value that the lateral acceleration obtained when said reducing control starts, is multiplied by an inverse of a product of the normal efficiency and the reverse efficiency of said speed reducing mechanism, to be equal to or greater than the lateral acceleration obtained in response to a turning limit of said vehicle.

3. A stabilizer control apparatus as set forth in claim 1 wherein the values of the normal efficiency and the reverse efficiency of said speed reducing mechanism are set to be within such a range that the inverse of the product of the normal efficiency and the reverse efficiency of said speed reducing mechanism is equal to or greater than 1.17 and equal to or smaller than 3.75.

4. A stabilizer control apparatus as set forth in claim 2, wherein the values of the normal efficiency and the reverse efficiency of said speed reducing mechanism are set to be within such a range that the inverse of the product of the normal efficiency and the reverse efficiency of said speed reducing mechanism is equal to or greater than 1.17 and equal to or smaller than 3.75.

* * * * *